United States Patent
Kennedy et al.

(10) Patent No.: US 10,630,069 B2
(45) Date of Patent: Apr. 21, 2020

(54) SOLID-STATE CIRCUIT INTERRUPTER AND ARC INHIBITOR

(71) Applicant: Atom Power, Inc., Charlotte, NC (US)

(72) Inventors: Ryan Kennedy, Charlotte, NC (US); Denis Kouroussis, Markham (CA)

(73) Assignee: Atom Power, Inc., Charlotte, NC (US)

( * ) Notice: Subject to any disclaimer, the term of this patent is extended or adjusted under 35 U.S.C. 154(b) by 350 days.

(21) Appl. No.: 15/723,358

(22) Filed: Oct. 3, 2017

(65) Prior Publication Data

US 2019/0103742 A1    Apr. 4, 2019

(51) Int. Cl.
| | |
|---|---|
| *H02H 7/00* | (2006.01) |
| *H02H 7/22* | (2006.01) |
| *H01H 9/54* | (2006.01) |
| *H02H 1/00* | (2006.01) |
| *H02H 3/093* | (2006.01) |

(Continued)

(52) U.S. Cl.
CPC ............. *H02H 7/22* (2013.01); *H01H 9/54* (2013.01); *H01H 9/548* (2013.01); *H01H 89/00* (2013.01); *H02H 1/0061* (2013.01); *H02H 1/0092* (2013.01); *H02H 3/093* (2013.01); *H02H 3/445* (2013.01)

(58) Field of Classification Search
None
See application file for complete search history.

(56) References Cited

U.S. PATENT DOCUMENTS

| 5,132,865 A | 7/1992 | Mertz et al. |
| 8,861,162 B2 * | 10/2014 | Fuller .................. H01H 9/548 |
| | | 361/42 |
| 9,287,065 B1 | 3/2016 | Davis et al. |

(Continued)

FOREIGN PATENT DOCUMENTS

CN      1558248 A     6/2016

OTHER PUBLICATIONS

P. Meckler, "Does an Electronic Circuit Breaker need Electrical Contacts?", Proceedings of the 50th IEEE Holm Conference on Electrical Contacts and the 22nd International Conference on Electrical Contacts, pp. 480-487, 2004.

(Continued)

*Primary Examiner* — Stephen W Jackson
(74) *Attorney, Agent, or Firm* — Patent Law Professionals, P.C.; William E. Winters

(57) ABSTRACT

A solid-state circuit interrupter and arc prevention device (SSI/APD) is disclosed. The SSI/APD is designed to be configured in series with a mechanical circuit breaker and serves to interrupt current flowing through the circuit it is protecting upon a short circuit being detected or if an overload has persisted for an inordinate amount of time. The SSI/APD is capable of detecting and responding to faults in a matter of microseconds and detects and responds to faults on its own, without requiring the mechanical circuit breaker to trip. The mechanical circuit breaker can be optionally tripped after the SSI/APD has opened the circuit. However, the mechanical circuit breaker is tripped only after the SSI/APD has interrupted the circuit, so electrical arcing across the circuit breaker's contacts is avoided. The SSI/APD can also be reset remotely after a fault has been cleared, obviating the need for a person to be present to reset it.

18 Claims, 11 Drawing Sheets

(51) Int. Cl.
    *H01H 89/00*     (2006.01)
    *H02H 3/44*     (2006.01)

(56) References Cited

U.S. PATENT DOCUMENTS

| | | |
|---|---|---|
| 2010/0232082 A1 | 9/2010 | Seger |
| 2011/0026185 A1 | 2/2011 | Boudet et al. |
| 2011/0102052 A1 | 5/2011 | Billingsley et al. |
| 2011/0222200 A1 | 9/2011 | Fuller et al. |
| 2011/0292556 A1 | 12/2011 | Britz |
| 2012/0218676 A1 | 8/2012 | Demetriades et al. |
| 2014/0029153 A1 | 1/2014 | Stefano et al. |
| 2015/0084420 A1 | 3/2015 | Dickerson et al. |
| 2015/0236502 A1 | 8/2015 | Xu et al. |
| 2015/0348722 A1 | 12/2015 | Fraser et al. |
| 2016/0197465 A1 | 7/2016 | Poulose et al. |
| 2017/0004948 A1 | 1/2017 | Leyh |
| 2017/0069441 A1 | 3/2017 | Mishrikey et al. |

OTHER PUBLICATIONS

May 30, 2019 Office Action from U.S. Appl. No. 15/443,736.
Mar. 7, 2018 Office Action, U.S. Appl. No. 29/555,717.
"Function and rated characteristic of circuit breaker—all things need to know of circuit breaker," dated; Nov. 20, 2013, accessed online on Apr. 25, 2018 at: http://eblogbd.com/details-characteristics-circuit-breaker/.
"Eaton's New Narrow Frame Power and Air Circuit Breaker Offers Reduced Size and Improved Safety," dated: Jun. 23, 2009, accessed online on Apr. 25, 2018 at: http://www.eaton.com/Eaton/OurCompany/newsevents/newsreleases/CT_238199.

\* cited by examiner

SOLID-STATE CIRCUIT INTERRUPTER AND ARC INHIBITOR

BACKGROUND OF THE INVENTION

Circuit breakers are used in electrical distribution systems to protect electrical circuits from abnormally high currents caused by faults and overloads. When a circuit breaker detects a fault or unacceptably high and prolonged overload it responds by opening or "breaking" its circuit to prevent overcurrents from flowing in the circuit, which otherwise could damage electrical equipment or cause fire due to excessive heating of the circuit's electrical wiring.

A circuit breaker is essentially a mechanically operated electrical switch with contacts that remain closed during normal operating conditions and that are opened when a fault or prolonged overload is detected. FIG. 1 is simplified drawing showing the salient components of a typical circuit breaker 100, configured in both the closed ("Not Tripped") and open ("Tripped") positions. The circuit breaker 100 includes LINE-IN and LINE-OUT terminals, which connect to an electrical power source (often from a power distribution panel or "panelbox") and a load (not shown in the drawing); a solenoid 102; a trip bar 104; a flexible bimetallic strip 106; a latch 108; and contacts 110. During normal operating conditions, when the contacts 110 are closed ("Not Tripped"), line current flows into the LINE-IN terminal, through the solenoid 102 coil and flexible bimetallic strip 106, and finally into the load, via the LINE-OUT terminal. There are two ways in which the circuit breaker 102 can be caused to trip—one due to a prolonged and unacceptably high overload condition and the other due to a short circuit. During an overload, when the line current is high but not at a level indicative of a short circuit, the current heats the bimetallic strip 106, causing it to bend and deflect toward the upper lever of the trip bar 104. The higher the current is the more the bimetallic strip 106 deflects. If the magnitude of the current is abnormally high and sustained over a period of time, the bimetallic strip 106 will deflect far enough to push against the upper lever of the trip bar 104 and cause the opposing end of the trip bar 104 to disengage from the latch 108. When the trip bar 104 disengages from the latch 108, the contacts 110 are then allowed to open ("Tripped"), as shown in the right-hand portion of FIG. 1. The contacts 110 of the circuit breaker 100 will also open when a short circuit occurs (the second way the circuit breaker can be tripped), and more rapidly. Specifically, when a short circuit occurs the solenoid 102 reacts by pulling its plunger inside the solenoid coil. As the plunger is retracted to inside the coil it also engages and pulls the trip bar 104, causing the trip bar 104 to rotate about its axis, disengage from the latch 108, and allow the contacts 110 to open.

Although mechanical circuit breakers have been in widespread use for many years, they have a number of important limitations. One limitation relates to the fact that a person must be physically present to reset the circuit breaker 100 after a fault or overload has been cleared. A person resets the circuit breaker 100 by manipulating a reset lever (not shown in FIG. 1) built into the circuit breaker. When the person "flips" the reset lever (similar to how a light switch is flipped) the trip bar 104, latch 108, and contacts 110 are reset to their "Not Tripped" positions. Some larger circuit breakers include electric motors that are adapted to reset the circuit breaker's contacts, thus obviating the need for a person to be present. However, motors are not always reliable, so relying on them to reset circuit breakers is not an optimal solution.

Mechanical circuit breakers are also limited in their ability to react quickly to faults, typically requiring a few or tens of milliseconds to detect and fully isolate faults. The slow reaction time is undesirable since it increases the risk that electrical equipment might be damaged and the possibility of fire.

Due to their mechanical construction and operation, the current and time thresholds at which mechanical circuit breakers trip can also vary considerably among circuit breakers of the same type and rating, even for circuit breakers of the same type and rating provided by the same manufacturer. This variability is typically shown in the time-current characteristic curves (i.e., "tripping curves") provided by the manufacturer, similar to as shown in FIG. 2. The upper left portion of the tripping curve represents the circuit breaker's thermal response to overloads (which, as explained above, the circuit breaker responds to using the bimetallic strip 106), and the lower right portion of the tripping curves provides information concerning how fast the circuit breaker can respond to short circuit faults. Since the performance of the circuit breaker will vary from one part to another, the tripping curve is expressed as a tolerance "band," rather than as a line. The tripping curves depicted in FIG. 2 show that the circuit breaker of this particular type and rating is guaranteed to clear a short circuit in no longer than 20 milliseconds. They also show that the circuit breaker will tolerate overload currents (i.e., "overcurrents") of up to five times (×5) the circuit breaker's rated current for up to one second. Actually, the tolerance band reveals that some circuit breakers of this same type and rating might be able to tolerate a current of ×5 the rated current for longer than one second. However, due to part-to-part variations, the manufacturer can only guarantee that any given circuit breaker will tolerate a current of ×5 the rated current for a maximum of one second.

Another limitation associated with mechanical circuit breakers is that electrical arcs are produced across the air gap that forms between the contacts when high voltages are interrupted. Electrical arcing is highly undesirable since not only can it cause pitting of the circuit breaker's contacts but because it can cause fires or explosions in environments that contain flammable vapors, for example as may occur in a room or area that is not well ventilated, such as a room or area that is not well ventilated and which contains hydrogen-producing batteries. Conventional mechanical circuit breakers often include some mechanism to extinguish arcs as they are produced, such as arc chutes that divide and cool the arcs, jet chambers that blast vaporized oil through the arcs, or compressed air to blow out the arcs. However, none of these techniques prevent arcing from occurring in the first place.

Finally, and again due to their mechanical construction and operation, the lifespans of mechanical circuit breakers are limited and shorter than desired. Not only does arc-induced pitting wear out the circuit breaker's contacts 110 over time, the other components of the circuit breaker 100 that must be mechanically manipulated to open and close the contacts 110 (e.g., trip bar 104, latch 108, springs, solenoid 102, etc.) are subjected to wear and tear every time the breaker is opened and closed and thus are also prone to failure.

Considering the various limitations of conventional mechanical circuit breakers, it would be desirable to have a circuit protection device and associated method that is more precise than conventional mechanical circuit breakers; that can detect and respond to faults much more rapidly than conventional mechanical circuit breakers; that prevents electrical arcing from occurring when high voltages are interrupted; that can be reset without a person being present; that is not subject to the wear and tear that besets conventional mechanical circuit breakers; and that has a lifespan much longer than conventional mechanical circuit breakers.

BRIEF SUMMARY OF THE INVENTION

A solid-state circuit interrupter and arc prevention device (SSI/APD) and a method of its operation are disclosed. The SSI/APD is designed so that it can be configured in series with a mechanical circuit breaker, such as a conventional Underwriters Laboratories (UL) standard 489 mechanical circuit breaker, and serves to interrupt current flowing through the circuit it is protecting upon a short circuit being detected or if an overload has persisted for an inordinate amount of time. The SSI/APD is capable of detecting and responding to faults in a matter of microseconds and detects and responds to faults on its own, without requiring the mechanical circuit breaker to trip. This fast detection/reaction capability not only protects against faults that originate in the SSI's/APD's load circuit, it also minimizes hazards associated with source side arc flashes and destructive short circuits since if an arc flash or destructive short circuit occurs on the source side and causes a fault to occur in the SSI's/APDs load circuit the SSI/APD will interrupt its circuit, also within a matter of microseconds. The mechanical circuit breaker can be optionally tripped after the SSI/APD has interrupted its circuit to isolate a load side fault that originated in the load circuit or that was caused by a source-side arc flash or fault. However, the mechanical circuit breaker is tripped only after the SSI/APD has interrupted the circuit, so electrical arcing across the circuit breaker's contacts is avoided. The SSI/APD can also be reset from a remote location after a fault has been cleared, thus obviating the need for a person to be present to reset the SSI/APD.

Further features and advantages of the invention, including a detailed description of the above-summarized and other exemplary embodiments of the invention, will now be described in detail with respect to the accompanying drawings, in which like reference numbers are used to indicate identical or functionally similar elements.

DETAILED DESCRIPTION

Figure 3:
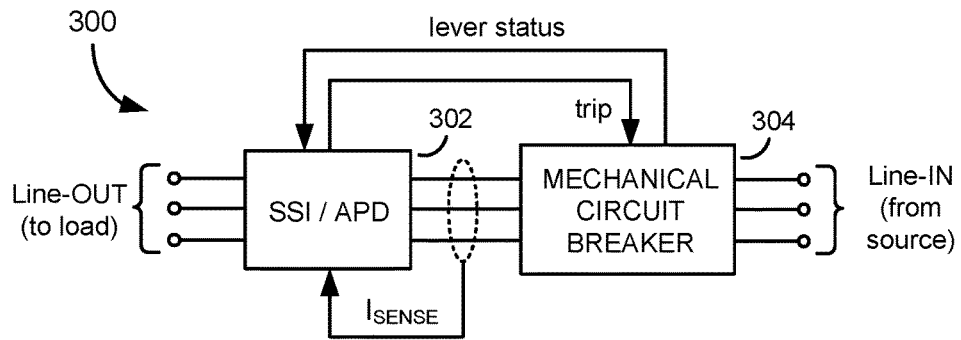
FIG. 3 is a simplified drawing of a combined solid-state/mechanical circuit breaker apparatus, according to one embodiment of the invention.

Referring to FIG. 3, there is shown a high level drawing of a combined solid-state/mechanical circuit breaker apparatus 300, according to an embodiment of the present invention. The combined solid-state/mechanical circuit breaker apparatus 300 comprises a solid-state interrupter and arc prevention device (SSI/APD) 302 which is designed so that it can be easily connected in series with a mechanical circuit breaker unit 304 (e.g., a conventional UL 489 circuit breaker) in an electrical distribution panel. One principal function of the SSI/APD 302 is to serve as an ultra-fast circuit interrupter. During operation the SSI/APD 302 continually monitors current flowing through the circuit it is protecting. Since the mechanical circuit breaker unit 304 is connected in series with the SSI/APD 302 the current also flows through the mechanical circuit breaker unit 304 and the connected load. If the monitored current (indicated as $I_{SENSE}$ in FIG. 3) exceeds some predetermined threshold current indicative of a fault, the SSI/APD 302 interrupts the current flowing in the circuit, in order to protect the load and prevent the electrical wiring from heating. Depending on the application the SSI/APD 302 may also be configured to direct the mechanical circuit breaker unit 304 to trip. The SSI/APD 302 also has the ability to reset the circuit in response to a reset command supplied from a local or remotely located host computer, once the SSI/APD 302 has cleared the fault. This remote reset capability obviates the need for a person to be present to reset the circuit and because the SSI/APD 302 can isolate faults on its own, i.e., without requiring the mechanical circuit breaker unit 304 to trip, the need for a motor-operated apparatus to reset the mechanical circuit breaker unit 304 can also be obviated.

The SSI/APD 302 also serves as an arc prevention device. Unlike the mechanical circuit breaker unit 304, the SSI/APD 302 does not have mechanically manipulated metal contacts that open to form an air gap. Rather, it employs a solid-state protection device, which is controlled to switch OFF and interrupt current to clear a fault. Accordingly, by employing the solid-state protection device, not only is the SSI/APD 302 capable of detecting and responding to faults much more rapidly than is possible using just a mechanical circuit breaker, it allows the circuit it is protecting to be opened without the hazards associated with arcing. Depending on the application and the user's preference, the SSI/APD 302 may also be configured to direct the mechanical circuit breaker unit 304 to trip, as indicated by the "trip" line directed from the SSI/APD 302 to the mechanical circuit breaker unit 304 in FIG. 3. However, since the SSI/APD 302 will have already interrupted current flow before directing the mechanical circuit breaker unit 304 to trip, arcing is also prevented from occurring across the contacts of the mechanical circuit breaker unit 304.

Figure 4:
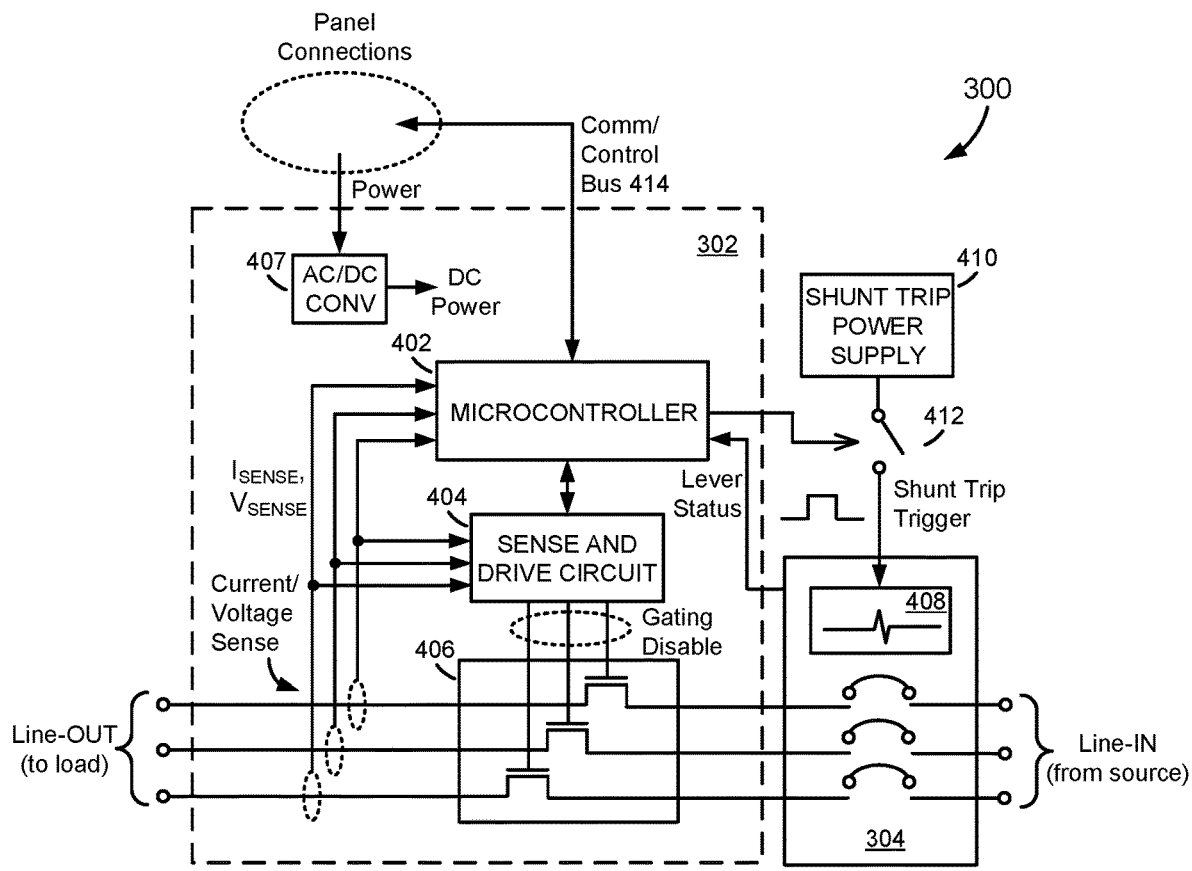
FIG. 4 is a more detailed drawing of the combined solid-state/mechanical circuit breaker apparatus depicted in FIG. 3.

FIG. 4 is a more detailed drawing of the combined solid-state/mechanical circuit breaker apparatus 300. The SSI/APD 302 comprises a microcontroller 402; a sense and drive circuit 404; a solid-state protection device 406; and a direct current (DC) power supply 407. In this particular exemplary embodiment, the combined solid-state/mechanical circuit breaker apparatus 300 is a three phase apparatus suitable for use in a three phase alternating current (AC) electrical distribution system. Accordingly, the solid-state protection device 406 includes three solid-state devices (in this example, three field-effect transistors (FETs)), one disposed in each of the three lines of the three-phase system, and the mechanical circuit breaker unit 304 includes three circuit breakers, also disposed in the three lines and in series with the three solid-state devices. While a three-phase example is shown and described here, in other embodiments of the invention the combined solid-state/mechanical circuit breaker apparatus 300 includes just a single solid-state device connected in series with a single circuit breaker, making those alternative embodiments suitable for use in single phase AC or two-pole direct current (DC) applications. It should also be mentioned that whereas FETs are shown in FIG. 4 as being used to implement the solid-state protection device 406, other types of solid-state devices may be used, instead, or in combination with the FETs, including, but not limited to, insulated gate bipolar junction transistors (IGBTs), thyristors, silicon-controlled rectifier (SCRs), triodes for alternating current (TRIACs). Finally, it should be mentioned that whereas the exemplary SSI/APD 302 depicted in FIG. 4 employs an AC/DC converter 407 that uses AC power from the line to produce the DC power for the microcontroller 402, sense and drive circuit 404, solid-state protection device 406, etc., a DC power supply that generates DC power independent of the AC line power could be alternatively used, or the SSI/APD could be configured to be powered by the AC/DC converter 407 (as shown in FIG. 4) but be configured to be alternatively powered by a backup DC power supply (e.g., a battery) in situations where AC line power is temporary unavailable.

The microcontroller 402 in the SSI/APD 302 comprises an integrated circuit (IC) and includes a digital signal processor, nonvolatile memory (e.g., flash memory and/or non-erasable read-only memory), and random-access memory (RAM). Instead of a microcontroller, a microprocessor, application specific IC, gate array, or other suitable controller could be used, as will be appreciated by those of ordinary skill in the art. The nonvolatile memory is configured to store computer program instructions that direct how the microcontroller 402 operates, including how it controls its solid-state protection device 406, how it monitors and controls the trip status of the mechanical circuit breaker unit 304, and how and what information it reports and receives from a local or remote host computer, as will be explained in more detail below. The nonvolatile memory may be further configured to store user-defined information a user wishes to remain nonvolatile and which the microcontroller 402 may use, for example, to configure the time-current characteristics of the SSI/APD 302 or the solid-state protection device 406, more specifically. The RAM is used by the digital signal processor to execute the computer program instructions retrieved from the nonvolatile memory during operation. In the exemplary embodiment of the SSI/APD 302 depicted in FIG. 4, the nonvolatile memory and RAM are embedded in the same IC chip as the processor. However, other types of microcontrollers or microprocessors that do not have embedded memory but employ external memory instead may be alternatively used, as will be appreciated by those of ordinary skill in the art. Further details, concerning the various operating and control functions of the microcontroller 402 are provided below.

A primary purpose of the sense and drive circuit 404 is to monitor the line current and generate gating disable signals that cause one or more of the solid state devices in the solid-state protection device 406 to switch OFF and interrupt current flow when the sensed line current reveals that a short circuit is imminent or that a prolonged and unacceptable overload condition has persisted for longer than a permissible amount of time. In a preferred embodiment of the invention, the portion of the sense and drive circuit 404 responsible for detecting and responding to short-circuits is implemented totally in hardware and is capable of detecting and responding to short circuits without the assistance of the microcontroller 402. A total hardware approach is preferred since it is the fastest way to detect and respond to short circuits. Although a total hardware approach is preferred, some of the various short-circuit detection and reaction functions could be controlled by software. In such a software-controlled implementation the microcontroller 402 would be programmed and configured to monitor the line current and produce (or direct the sense and drive circuit 404 to produce) the gating disable signals necessary to switch the solid-state protection device 406 OFF. Alternatively, these various functions could be performed partly by the sense and drive circuit 404 hardware and partly by the microcontroller 402.

Figure 5:
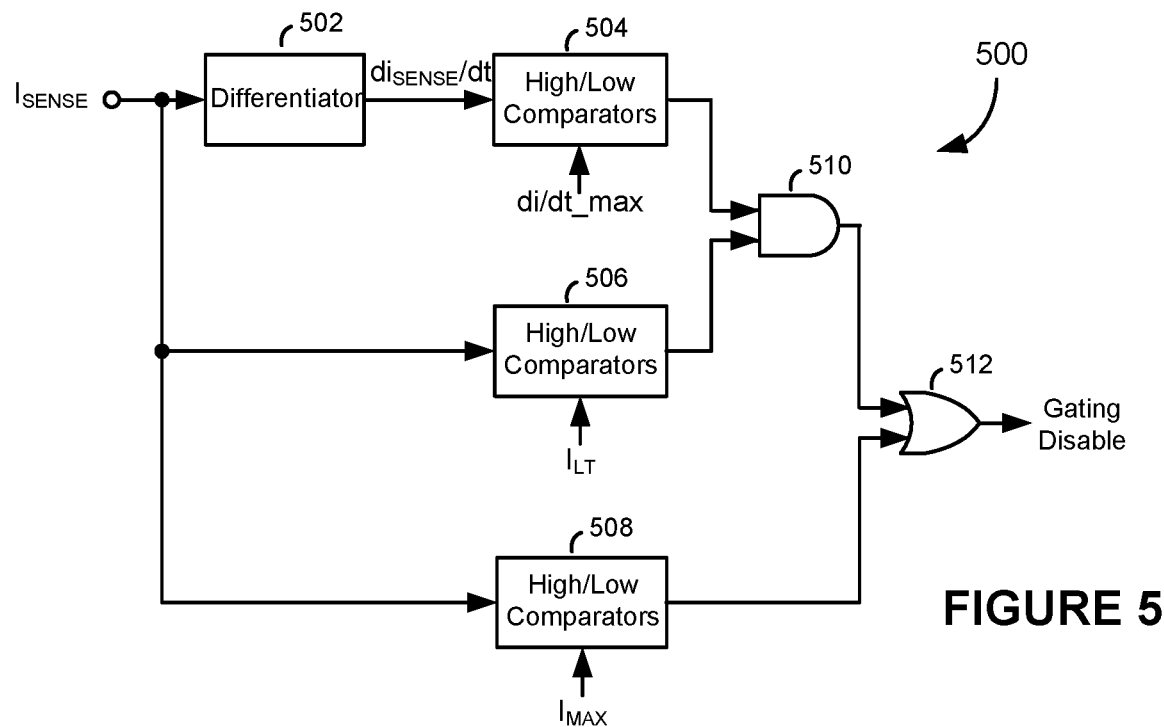
FIG. 5 is a drawing of a sense and drive circuit that may be used to implement the sense and drive circuit of the combined solid-state/mechanical circuit breaker apparatus depicted in FIG. 4.

FIG. 5 is a drawing showing the various components of an exemplary sense and drive circuit 500, which may be used to implement the sense and drive circuit 404 in FIG. 4. The exemplary sense and drive circuitry 500 includes a differentiator 502; first, second and third high/low comparators 504, 506, 508; an AND logic gate 510; and an OR gate 512. (Note that the sense and drive circuit 500 in this example is only for a single phase. Two additional similar sense and drive circuits would be used to sense the two other line currents in the remaining two phases of a three-phase system.) The differentiator 502 operates to differentiate a sense current $I_{SENSE}$ representative of the current flowing through the solid-state protection device 406. As will be understood by those of ordinary skill in the art, the sense current $I_{SENSE}$ may be obtained using a sense resistor, current sense transformer, or any other suitable current sensing device. The resulting differentiated sense current $di_{SENSE}/dt$ is indicative of the rate of change of the sense current $I_{SENSE}$. The first and second high/low comparators 504 and 506 and AND logic gate 510 serve to determine whether a sudden change in current drawn from the Line-IN terminal is due to an impending fault or is the result of a resistive load being brought online (or being "turned on"). Performing this operation is important since it prevents the SSI/APD 302 from prematurely or unnecessarily interrupting the line current in the event that the sudden change in current is due to a resistive load being brought online and not due to an impending fault. (Note that in this exemplary embodiment, the line current is AC and each of the comparators 504, 506 and 508 includes both a high comparator and a low comparator, thus allowing a sudden change in line current to be detected during both the positive and negative half cycles of the line current AC waveform.) In determining whether a sudden change in current drawn is due to an impending fault or is the result of a resistive load being brought online, the first high/low comparator 504 compares the differentiated sense current $di_{SENSE}/dt$ to a predetermined maximum rate of change in current di/dt_max. If the differentiated sense current $di_{SENSE}/dt$ exceeds the maximum rate of change in current di/dt_max, the first high/low comparator 504 produces a logic HIGH output. The logic HIGH output is an indication that a fault may be developing in the load circuit. On the other hand, so long as the differentiated sense current $di_{SENSE}/dt$ remains less than the maximum rate of change in current di/dt_max, the first high/low comparator 504 produces a logic LOW output.

When a resistive load is being brought online, the current that it draws will be step-like. However, an impending fault will also produce a step-like change in current. Since $di_{SENSE}/dt$ is high in both cases, a $di_{SENSE}/dt$ that exceeds di/dt_max is not by itself sufficient to conclude with absolute certainty that a fault is developing in the circuit. However, one significant difference between a developing fault and the turn-on transient of the resistive load is that once the turn-on transient of the resistive load has completed, which will happen very quickly, the magnitude of current that the resistive load draws will level off to some finite value (the specific value depending on the resistance of the load). Conversely, when a fault is developing, the magnitude of the current will rise to a much higher magnitude. The sense and drive circuit 500 exploits this difference to detect and determine whether a resistive load is being brought online or a fault is developing. Specifically, the second high/low comparator 506 compares the magnitude of the sense current $I_{SENSE}$ to the magnitude of a "long-time trip threshold current" $I_{LT}$ (shown in the time-current characteristic curves of the SSI/APD 302 in FIG. 6). So long as either $di_{SENSE}/dt$ remains below di/dt_max or the current being drawn from the line, as represented by the sense current $I_{SENSE}$, remains below the long-time trip threshold current $I_{LT}$, the AND logic gate 510 will produce a logic LOW output and the solid-state protection device 406 remains ON. In this manner, even if $di_{SENSE}/dt$ exceeds di/dt_max as the resistive load is being brought on line the resistive load will still be allowed to be brought online so long as the maximum current it draws does not result in the sense current $I_{SENSE}$ exceeding the long-time trip threshold current $I_{LT}$. On the other hand, if the current being drawn from the line, as represented by the sense current $I_{SENSE}$, rises to a value greater than the long-time trip threshold current $I_{LT}$, the second high/low comparator 506 produces a logic HIGH output. Accordingly, in a situation where both $di_{SENSE}/dt$ exceeds di/dt_max AND the current being drawn from the line, as represented by the sense current $I_{SENSE}$, exceeds the long-time trip threshold current $I_{LT}$, the AND logic gate 510 will generate a logic HIGH output. The logic HIGH output indicates that a short circuit is imminent or that an exceedingly high and unacceptable overload condition is present or developing. If it is indicative of an imminent short circuit, the logic HIGH output of the AND logic gate 510 is allowed to immediately propagate to the input of the OR gate 512, which responds by immediately producing a gating disable signal to switch the solid-state protection device 406 OFF. However, if the unacceptably high current is representative of an overload and not indicative of an imminent short circuit, the microcontroller 402 directs the sense and drive circuit 500 to delay application of the gating disable signal to the input of the solid-state protection device 406, in accordance with time-current characteristic curves in FIG. 6.

The third high/low comparator 508 serves to continually compare the incoming sense current $I_{SENSE}$ to an "instant-trip threshold current" $I_{MAX}$. The instant-trip threshold current $I_{MAX}$ is the maximum current that the SSI/APD 302 will allow to flow under any circumstance. If at any time the current drawn by the load, as represented by the sense current $I_{SENSE}$, exceeds the instant-trip threshold current $I_{MAX}$, the third high/low comparator 508 will produce a logic HIGH and the OR logic gate 512 will then produce a gating disable signal that immediately commands the solid-state protection device 406 to switch OFF and open the circuit. The time it takes for the solid-state protection device 406 to turn OFF is limited only by the propagation delay of the sense and drive circuit logic and the time it takes for the solid-state protection device 406 to change state. The word "instant" is used here to indicate that this time will be on the order of a few microseconds or even less.

The sense and drive circuit 500 is further capable of distinguishing between resistive and inductive loads and protecting against exceedingly high inrush currents, which occur when an inductive load, such as an induction motor, is being brought online. An inductive load will result in a smaller $di_{SENSE}/dt$ when being brought online than the near step-like $di_{SENSE}/dt$ that results when a resistive load being brought online and under normal operating conditions will remain less than di/dt_max. Accordingly, so long as $di_{SENSE}/$ dt remains less than di/dt_max and the sense current $I_{SENSE}$ remains below the instant-trip threshold current $I_{MAX}$ during an inrush event, the output of the OR logic gate 512 will remain at a logic LOW as the inductive load is being brought online. However, if the inrush current ever exceeds the instant-trip threshold current $I_{MAX}$ during the inrush event, the third high/low comparator 508 will produce a logic HIGH output, which after propagating through the OR logic gate 512 will command the solid-state protection device 406 to switch OFF.

Figure 1:
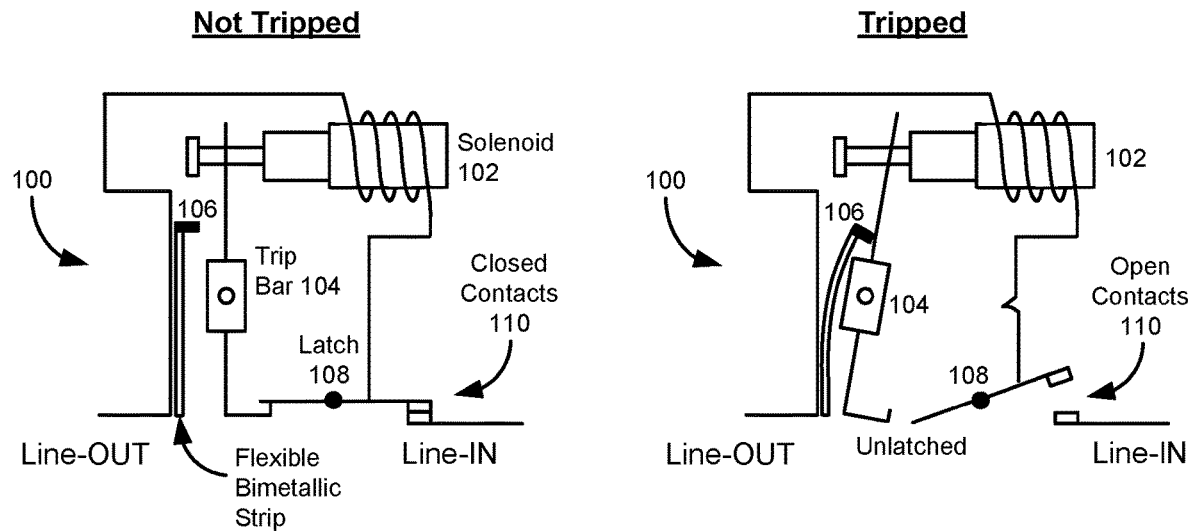
FIG. 1 is simplified drawing of a conventional mechanical circuit breaker in both closed ("Not Tripped") and open ("Tripped") positions.
Figure 2:
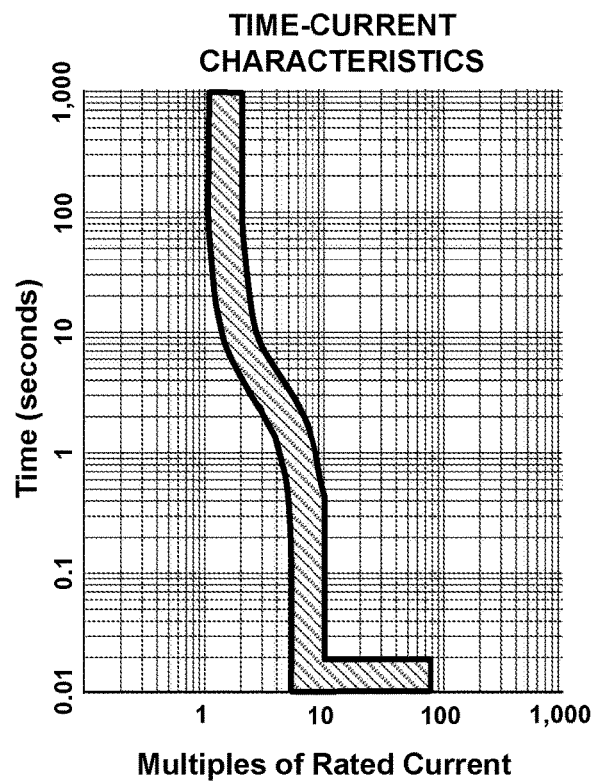
FIG. 2 is a graph showing typical time-current characteristics of a conventional mechanical circuit breaker.

In addition to having the ability to isolate a fault nearly instantaneously, the SSI/APD 302 controls current flow with a much higher degree of precision than is possible using just a mechanical circuit breaker. These capabilities are made possible by virtue of the fact that the SSI/APD 302 does not have any moving parts and uses the solid-state protection device 406 to interrupt current, rather than mechanically manipulated metal contacts. Solid-state devices can be manufactured repeatedly to have nearly identical operating characteristics. This results in much lower part-to-part variability compared to conventional mechanical circuit breakers. As was explained above in reference to FIGS. 1 and 2 above, the time-current characteristics of conventional mechanical circuit breakers vary considerably from part to part and are not well controlled. This forces the manufacturer to provide time-current characteristic curves having wide uncertainty bands. Here, because the SSI/APD 302 employs a solid-state protection device 406, no uncertainty bands are present and the time-current characteristics curves are represented as a single line, as shown in FIG. 6.

Figure 6:
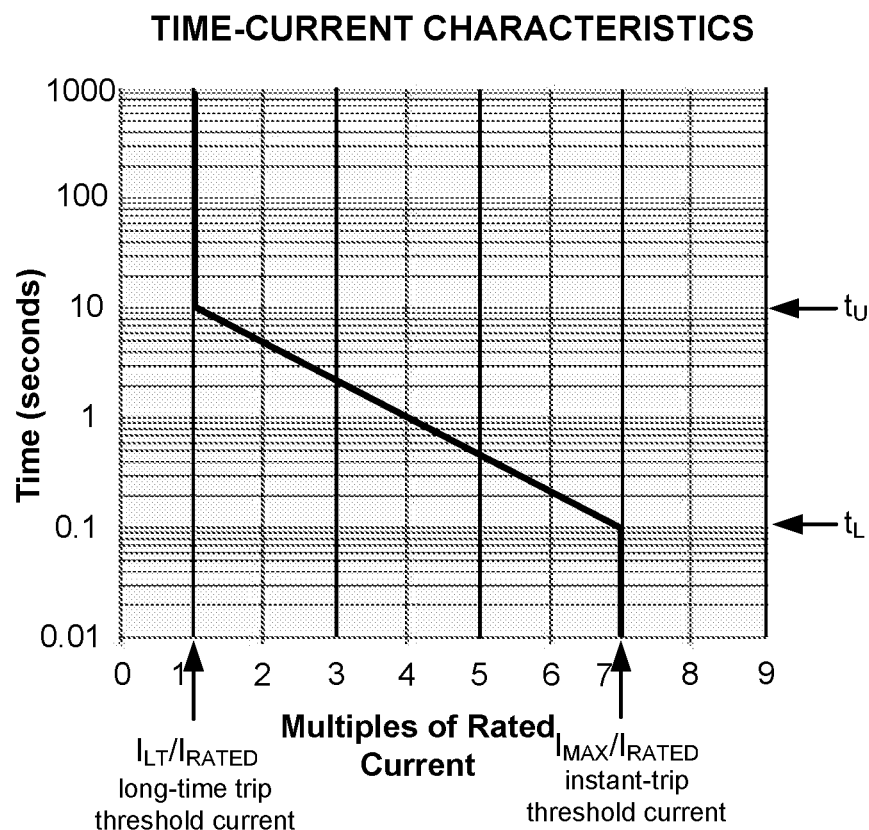
FIG. 6 is a drawing showing time-current characteristics of the solid-state interrupter and arc-prevention apparatus (SSI/APD) of the combined solid-state/mechanical circuit breaker apparatus depicted in FIGS. 3 and 4.

In one embodiment of the invention the SSI/APD 302 provides a user the ability to set and vary the operational parameters of the SSI/APD 302, including the maximum rate of change in current di/dt_max, long-time trip threshold current $I_{LT}$, instant-trip threshold current $I_{MAX}$ used by the sense and drive circuit 500, and/or the upper and lower short-time time thresholds $t_U$ and $t_L$, which define the overload region of the time-current characteristics (see FIG. 6). The ability to adjust and vary the operational parameters of the SSI/APD 402 affords great flexibility in configuring the SSI/APD 302 for any particular application. This flexibility, together with the fact that the time-current characteristics are precise and not represented as wide uncertainty bands, greatly simplifies coordination among other SSIs/APDs in an electrical distribution system, such as described in co-pending and commonly assigned U.S. patent application Ser. No. 15/076,304, entitled "Dynamic Coordination of Protection Devices in Electrical Distribution Systems," which is incorporated herein by reference. Moreover, even after an SSI/APD 302 has been installed in an electrical distribution system, any one or more of the operational parameters can be readjusted, as necessary or desired, for example to accommodate changing load conditions or complete or adjust coordination among other current interrupters and/or circuit breakers.

Figure 7:
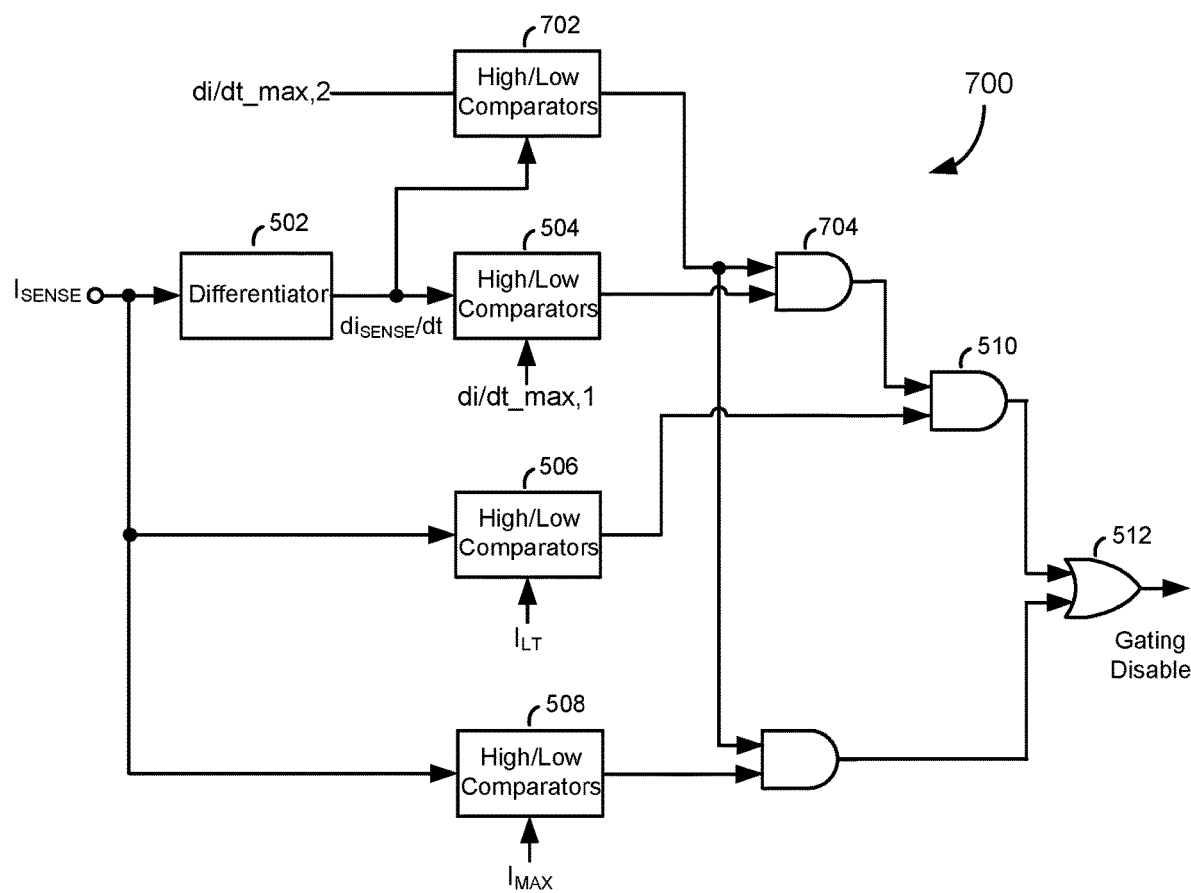
FIG. 7 is a drawing of a sense and drive circuit that may be used to implement the sense and drive circuit of the combined solid-state/mechanical circuit breaker apparatus depicted in FIG. 4.

In one embodiment of the invention, the sense and drive circuit 500 of the SSI/APD 302 is modified to include additional circuitry capable of detecting the occurrence of a lighting strike and distinguishing between a lighting strike and a short circuit. The ability to distinguish between a lighting strike and a short circuit is desirable since if a sudden and large change in current is determined to be attributable to a lighting strike, the SSI/APD 302 can be prevented from unnecessarily switching OFF during the brief moment the lightning strike lasts. FIG. 7 is a drawing of a modified sense and drive circuit 700 having this capability. The sense and drive circuit 700 is similar to the sense and drive circuit 500 discussed above (see FIG. 5 and accompanying description), except that it further includes a fourth high/low comparator 702 and an additional AND logic gate 704. The sense and drive circuit 700 operates based on the fact that the rate of change in current attributable to a lighting strike is greater than the rate of change in current caused by a short circuit, i.e., di/dt_lightning>di/dt_short. The high/low comparator 702 is configured to compare $di_{SENSE}/dt$ to a current rate of change reference di/dt_max,2, which is greater than the current rate of change reference di/dt_max,1 used by the comparator 504 in detecting a short circuit condition. During the occurrence of a lighting strike $di_{SENSE}/dt$ will be greater than di/dt_max,2, so the high/low comparator 702 will produce a logic LOW at its output. This logic LOW is propagated to the input of the OR gate 512, via AND gates 704 and 510. Accordingly, during a lightning strike the output of the OR gate 512 will remain at a logic LOW and the SSI/APD 302 will continue operating through the lighting strike, i.e., will not command the solid-state protection device 406 to switch OFF. If, on the other hand, di/dt_max,2>$di_{SENSE}/dt$>di/dt_max,1, the sense and drive circuit 700 will operate similar to the sense and drive circuit 500 described above in FIG. 5, in order to determine whether the sudden change in line current might be due to an impending fault or exceedingly high overload condition. Specifically, if $di_{SENSE}/dt$ exceeds di/dt_max,1 AND the current being drawn from the line (as represented by the sense current $I_{SENSE}$) exceeds the long-time trip threshold current $I_{LT}$ (together an indication that a short circuit is developing or an overload is present), the AND logic gates 704 and 510 will both generate a logic HIGH output, and the final OR gate 512 will then also produce a logic HIGH gating disable output to switch the solid-state protection device 406 OFF.

Figure 8:
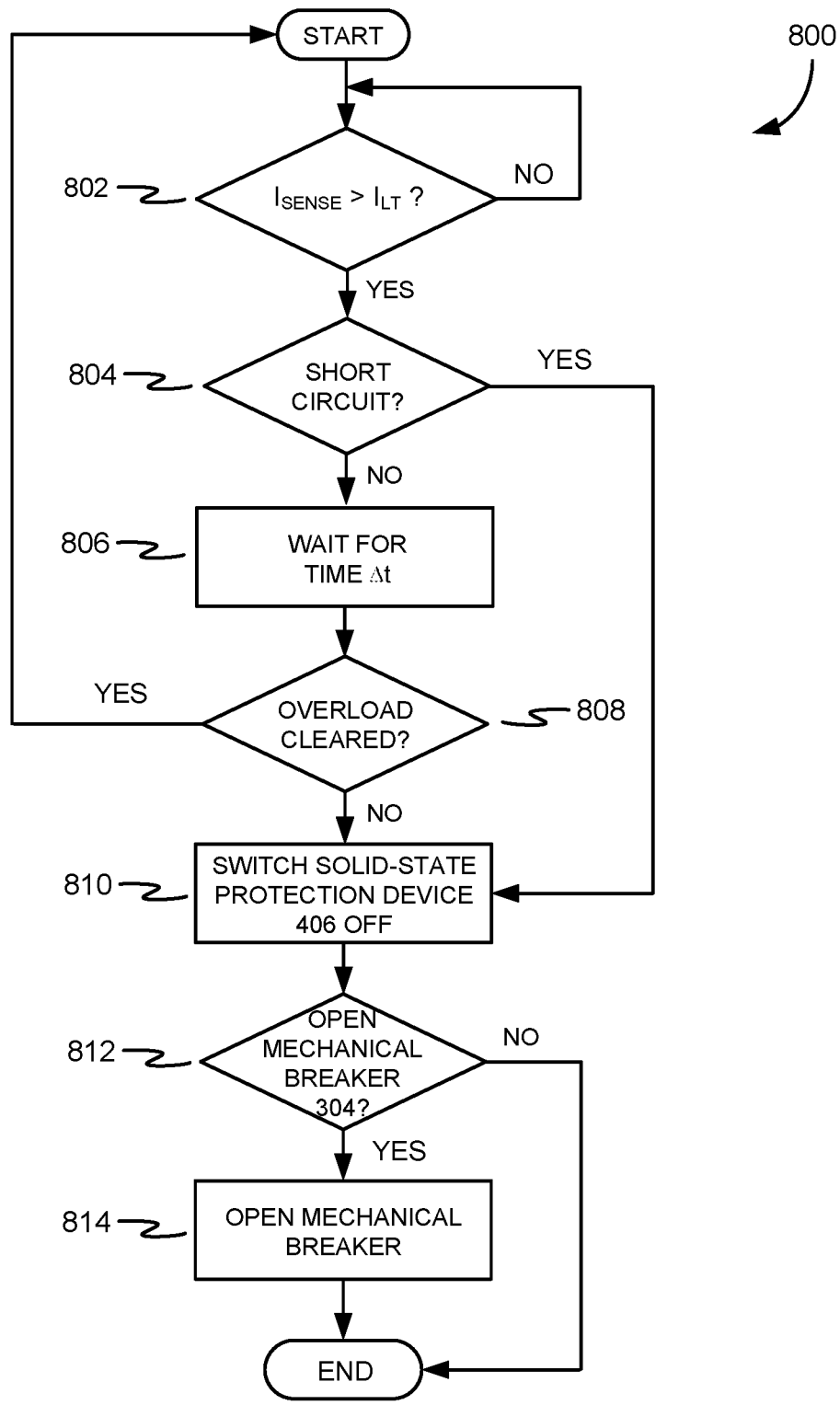
FIG. 8 is a flowchart illustrating a current interrupter method that the SSI/APD of the combined solid-state/mechanical circuit breaker apparatus depicted in FIG. 4 performs, in accordance with one embodiment of the invention.

FIG. 8 is a flowchart illustrating a method 800 the SSI/APD 302 performs, in accordance with one embodiment of the invention. Some of the various steps in the method 800 have already been described to some extent above; however, the flowchart is provided here to emphasize the sequence of events that the SSI/APD 302 follows in the process of interrupting current, once a fault or unacceptable overload has been detected, and to further emphasize the ability of the SSI/APD 302 to optionally trip the mechanical circuit breaker unit 304 in applications where tripping the mechanical circuit breaker unit 304 is desired or required. As was discussed above, detecting and responding to short-circuits is preferably, though not necessarily, performed completely by the hardware of the sense and drive circuit 500 (or sense and drive circuit 700). Accordingly, steps 802, 804 and 810 are preferably performed by the sense and drive circuit 500 (or sense and drive circuit 700) and the other steps in the method 800 are performed by a combination of hardware and software, under the control and direction of the microcontroller 402. During first step 802, the sense and drive circuit logic continually monitors the sensed line current $I_{SENSE}$. If it detects that the sensed line current $I_{SENSE}$ has exceeded the long-time trip threshold current $I_{LT}$, at decision 804 it determines whether the rise in current is at a level indicative of a short circuit, and if "YES" generates the gating disable signal to immediately switch the solid-state protection device 406 OFF. If, on the other hand, it is determined that the sensed current $I_{SENSE}$ is abnormally high but not at a level indicative of an short circuit, a conclusion is drawn that an overload is present and at step 806 the microcontroller 402 delays the sense and drive logic's generation of the gating disable signal, in accordance with time-current characteristic curves in FIG. 6. If, after waiting for a time Δt (determined by the current level of the magnitude of the line current and the SSI's/APD's time-current characteristics), decision 808 determines that the overload has cleared, the method 800 branches back to the START. On the other hand, if the overload has not cleared, even after waiting for time Δt, a gating disable signal is generated at step 810 to switch the solid-state protection device 406 OFF and thereby interrupt current flow in the circuit. Next, at decision 812, the microcontroller 402 determines whether the mechanical circuit breaker unit 304 should also be tripped. As explained above, tripping the mechanical circuit breaker unit 304 is not necessary to clear the fault since the SSI/APD 302 can complete that task by itself. However, tripping the mechanical circuit breaker unit 304 is an option made available to the user. Accordingly, if a user has programmed the microcontroller 402 to generate a trip signal to trip the mechanical circuit breaker unit 304, SSI/APD 302 transmits a trip signal to the mechanical circuit breaker unit 304 at step 814, causing the mechanical circuit breaker unit 304 to trip, and the method 800 then ends. There are various way by which the microcontroller 402 can cause the mechanical circuit breaker unit 304 to trip. In one embodiment of the invention, the mechanical circuit breaker unit 304 is equipped with a shunt trip coil 408, as illustrated in FIG. 4, and the microcontroller 402 is programmed to send a signal to a switch or relay 410, which produces a shunt trip trigger signal that causes the shunt trip coil 408 to pull open the contacts of the mechanical circuit breaker unit 304.

Because the SSI/APD 302 is capable of isolating a fault on its own, in most circumstances the mechanical circuit breaker unit 304 of the combined solid-state/mechanical circuit breaker apparatus 300 never needs to trip. However, including it and connecting it in series with the SSI/APD 302 guarantees that all electrical codes are complied with, and from this perspective the SSI/APD 302 may be considered as a "supplemental" circuit protection device. There are various advantages that follow from using the SSI/APD 302 to interrupt faults and not requiring the mechanical circuit breaker unit 304 to trip. First, and was already highlighted above, short circuits can be detected and responded to by the SSI/APD 302 in a matter of a few microseconds, rather than several milliseconds, as is typical for a conventional mechanical circuit breaker. This fast detection/reaction capability not only protects against faults that originate in the SSI's/APD's load circuit, it also minimizes the hazards associated with source side arc flashes and destructive short circuits since if an arc flash or destructive short circuit occurs on the source side and causes a fault to occur in the SSI's/APDs load circuit the SSI/APD will interrupt its circuit, also within a matter of microseconds. Second, since the contacts of the mechanical circuit breaker unit 304 do not ever need to be opened, wear and tear of the mechanical circuit breaker 304 caused by repeatedly opening and closing the circuit breaker's 304's contacts is avoided. Third, even in situations where the contacts of the mechanical circuit breaker unit 304 are opened, arcing and pitting of the mechanical circuit breaker unit's 304's contacts is avoided since the contacts are never opened while loaded. The ability to prevent arcing is significant, not just because it extends the life of the mechanical circuit breaker unit 304 but because it completely eliminates the risk of arc-induced fires and explosions. Preventing arcing from occurring across the mechanical circuit breaker's 304's contacts can also simplify the construction of the mechanical circuit breaker unit 304 since arc-extinguishing apparatuses such as arc chutes, vaporized-oil jet chambers, and compressed air blowers, etc.

are no longer necessary. Finally, since the contacts of the mechanical circuit breaker unit 304 never need to be opened, resetting the combined solid-state/mechanical circuit breaker apparatus 300 is as simple as resetting the gating signal produced by the sense and drive circuit 404. Resetting can be performed automatically, under the direction of the microcontroller 402, or in response to a command from a local or remotely located host computer.

Figure 9:
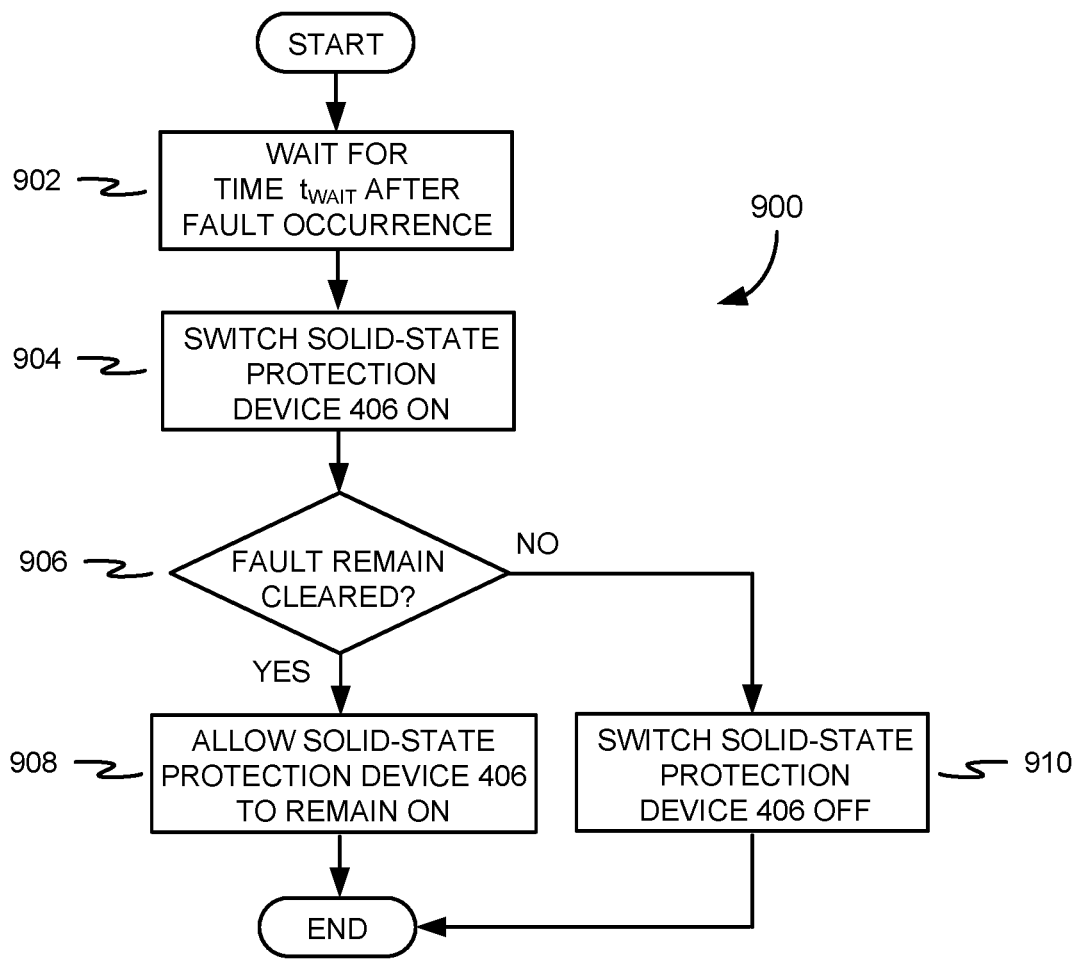
FIG. 9 is a flowchart illustrating one method by which the microcontroller of the SSI/APD of the combined solid-state/mechanical circuit breaker apparatus depicted in FIG. 4 performs to direct an automatic reset of the SSI's/APD's solid-state protection device, in accordance with one embodiment of the invention.

FIG. 9 is a flowchart illustrating one method 900 by which the microcontroller 402 directs an automatic reset. First, at step 902 the microcontroller 402 waits for a predetermined time $t_{WAIT}$ (anywhere from a few microseconds to several seconds, depending on the application) after a fault has occurred. At step 904 the microcontroller 402 then generates a switch ON signal (or commands the sense and drive circuit 404 to generate a switch ON signal) that momentarily turns the solid-state protection device 406 ON. Immediately after turning the solid-state protection device 406 ON, at decision 906 the microcontroller determines whether the fault has cleared. The microcontroller can do this on its own by detecting $I_{SENSE}$ and determining if $I_{SENSE}<I_{LT}$. Alternatively, the sense and drive circuit 404 can be configured to override the microcontroller 402 and switch the solid-state protection device 406 back OFF, as indicated in step 910, if the fault has not cleared. Finally, if at decision 906 it is determined that the fault has in fact cleared, at step 908 the solid-state protection device 406 is allowed to remain ON and the method 900 ends.

Figure 10:
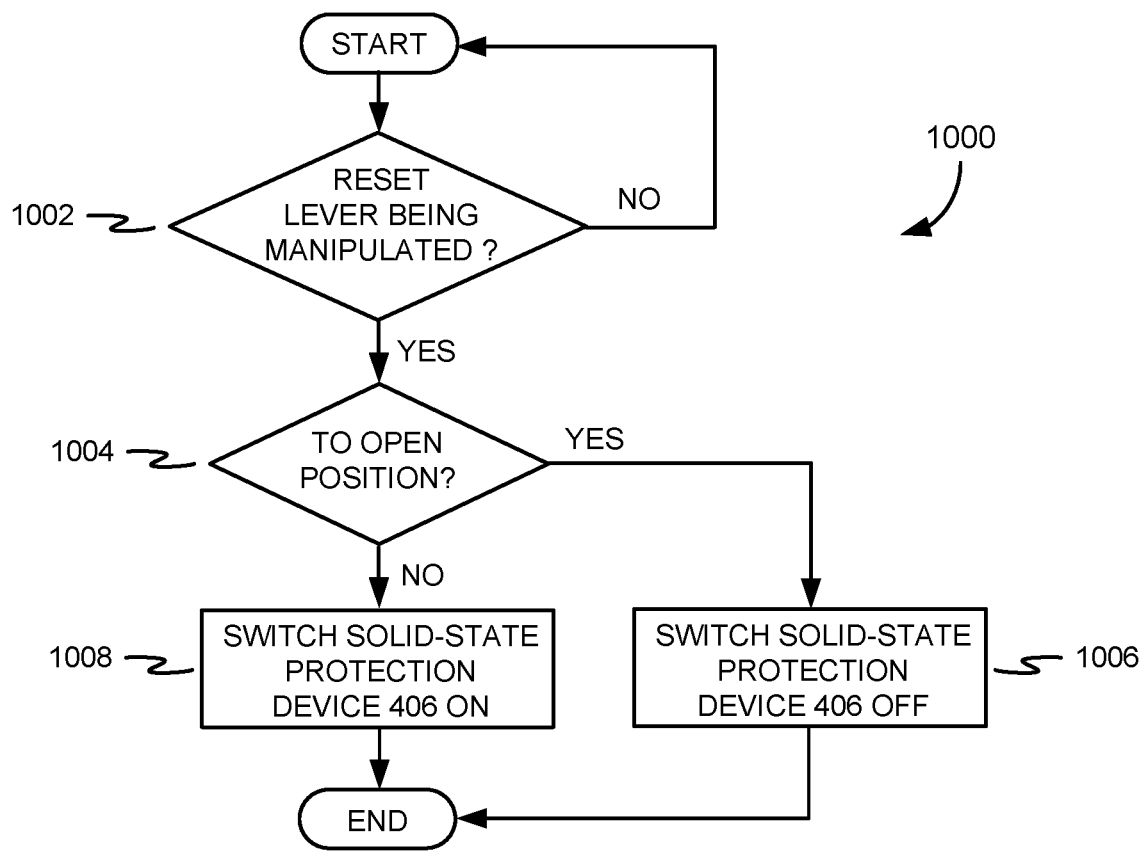
FIG. 10 is a flowchart illustrating a method the SSI/APD of the combined solid-state/mechanical circuit breaker apparatus depicted in FIG. 4 performs when a person or machine attempts to manipulate the reset lever of the mechanical circuit breaker unit of the combined solid-state/mechanical circuit breaker and how the SSI/APD responds, according to one embodiment of the invention.

In addition to monitoring the line current, interrupting current when conditions warrant, and resetting the solid-state protection device 406 after a fault has cleared, in one embodiment of the invention the SSI/APD 302, specifically its microcontroller 402, is further programmed to detect when a person (or machine) is attempting to manipulate the reset lever of the mechanical circuit breaker unit 304. FIG. 10 is a flowchart illustrating a method 1000 the SSI/APD 302 performs when such an action is detected and how the SSI/APD 302 responds, according to this embodiment of the invention. First, at decision 1002, the SSI/APD 302 continually monitors a lever status signal from the mechanical circuit breaker unit 304, for example as provided by a motion or level sensor attached to the breaker's reset lever. The lever status signal changes state when a person (or machine) attempts to manipulate (i.e., attempts to open or close) the mechanical circuit breaker unit 304 and provides information concerning whether an attempt is being made to open or close the contacts of the mechanical circuit breaker unit 304. Accordingly, if at decision 1004 the SSI/APD 302 determines that a person or machine is attempting to manipulate the reset lever of the mechanical circuit breaker unit 304 to the open position, at step 1006 the microcontroller 402 generates (or directs the sense and drive circuit 404 to generate) a gating disable signal to cause the solid-state protection device 406 to switch OFF. Preferably, the solid-state protection device 406 is turned OFF much faster than it takes for the reset lever to complete repositioning the contacts to the open position. In this manner the contacts of the mechanical circuit breaker unit 304 are not loaded when opened and arcing across the contacts is avoided. If at decision 1004 the SSI/APD 302 determines that the person or machine is attempting to manipulate the reset lever of the mechanical circuit breaker unit 304 to the closed position, at step 1008 the microcontroller 402 generates (or directs the sense and drive circuit 404 to generate) a gating enable signal that causes the solid-state protection device 406 to switch ON.

Figure 11:
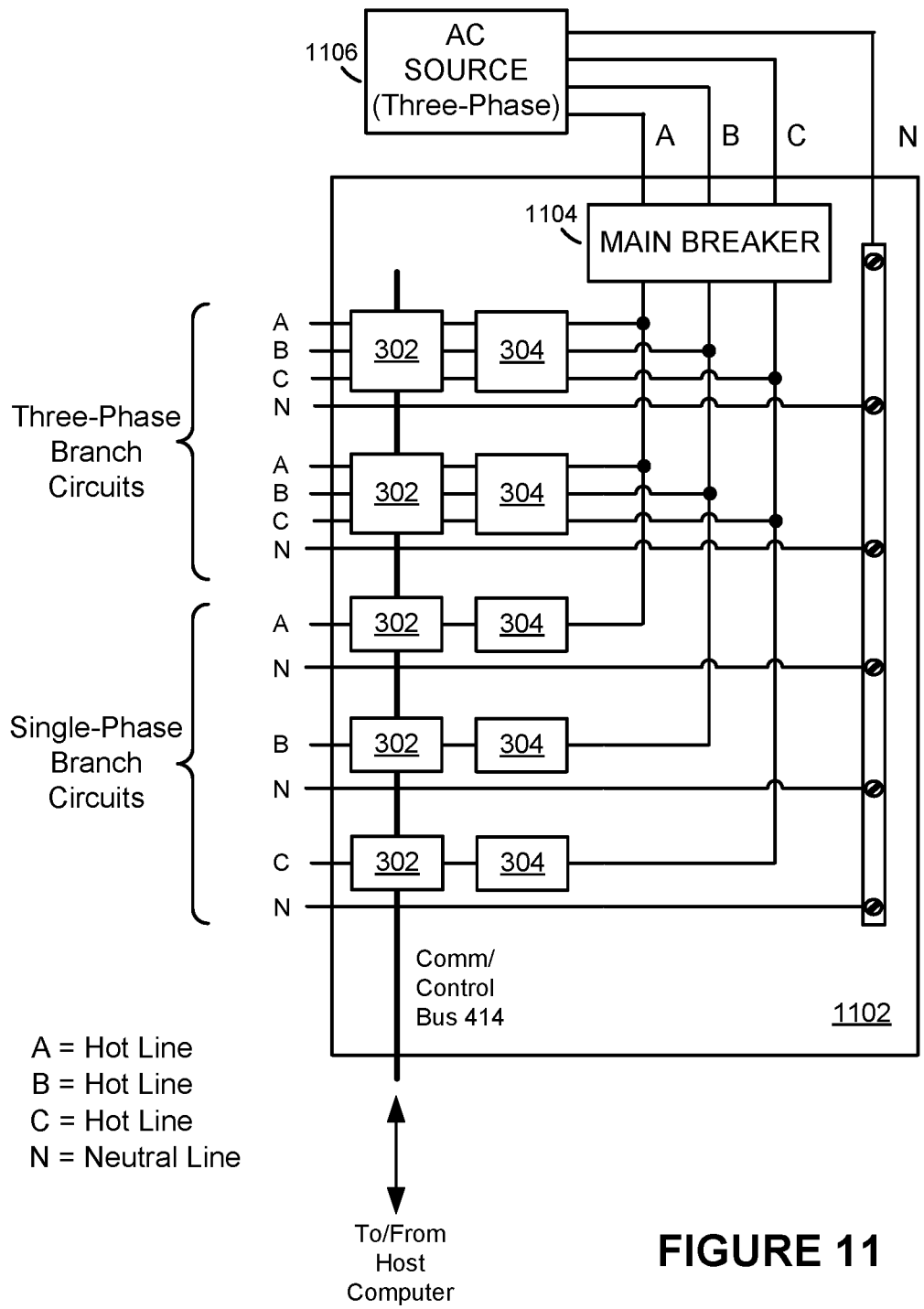
FIG. 11 is a drawing illustrating how a plurality of combined solid-state/mechanical circuit breaker apparatuses of the type depicted in FIGS. 3 and 4 can be configured in an electrical power distribution panel.
Figure 12:
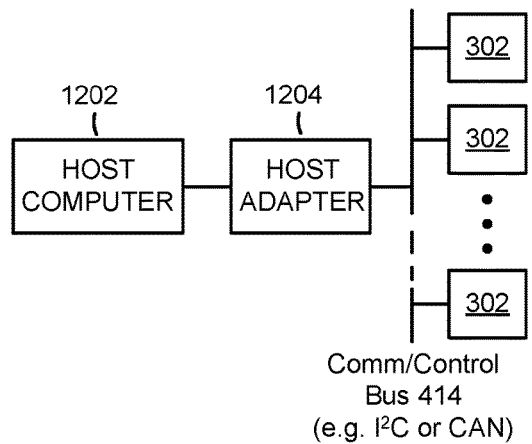
FIG. 12 is a drawing that illustrates how a host computer can directly communicate with and control a plurality of combined solid-state/mechanical circuit breaker apparatuses of the type depicted in FIGS. 3 and 4, over a communications and control (comm/control) bus, in accordance with one embodiment of the invention.
Figure 13:
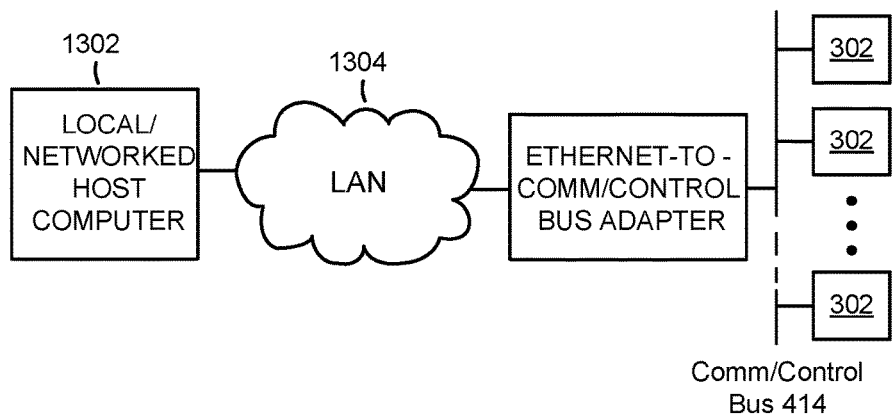
FIG. 13 is a drawing that illustrates how a local and networked host computer can communicate with and control a plurality of combined solid-state/mechanical circuit breaker apparatuses of the type depicted in FIGS. 3 and 4, via a local area network (LAN) and over a communications and control bus, in accordance with one embodiment of the invention.
Figure 14:
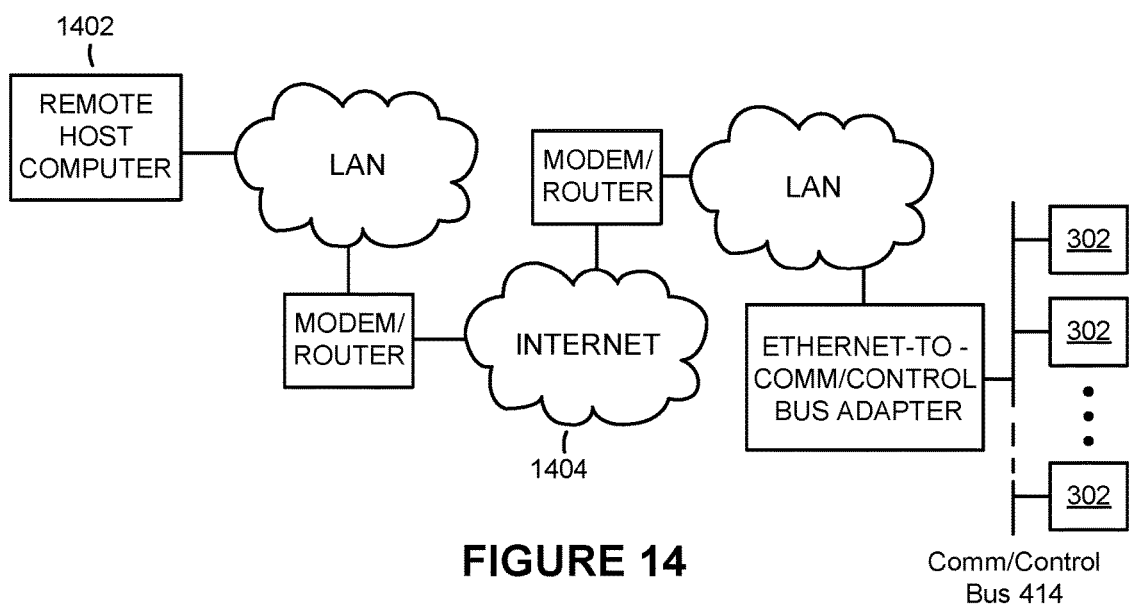
FIG. 14 is a drawing that illustrates how a remotely located host computer can communicate with and control a plurality of combined solid-state/mechanical circuit breaker apparatuses of the type depicted in FIGS. 3 and 4, via the Internet and one or more local area networks (LANs) and over a communications and control bus, in accordance with one embodiment of the invention.

FIG. 11 is a drawing illustrating how a plurality of combined solid-state/mechanical circuit breaker apparatuses 300, some three phase and others single phase, can be configured in an electrical power distribution panel 1102. Similar to as discussed above in reference to FIGS. 3 and 4, each combined solid-state/mechanical circuit breaker apparatus 300 includes an SSI/APD 302 and a mechanical circuit breaker unit 304. Three-phase AC power from a three-phase AC power source (for example, the AC mains) is fed to a main circuit breaker 1104, which controls whether the AC power is allowed to distribute to the combined solid-state/mechanical circuit breaker apparatuses 300 inside the distribution panel panelbox. Although not shown in the drawing, the main circuit breaker 1104 may also be implemented using an SSI/APD 302, similar to the other combined solid-state/mechanical circuit breaker apparatuses 300. FIG. 11 further illustrates how the SSIs/APDs 302 are connected to a communications and control (comm/control) bus 414. In one embodiment of the invention the comm/control bus 414 is a standard computer serial bus, such as an Inter-Integrated Circuit (I²C) bus or Controller Area Network (CAN) bus, over which the SSIs/APDs 302 of the combined solid-state/mechanical circuit breaker apparatuses 300 communicate with a host computer, including receiving control commands from the host computer and sending diagnostic and operational information and data to the host computer. The host computer may be a host computer 1202 that directly connects to the comm/control bus 414, via a host adapter 1204, such as illustrated in FIG. 12; a local and networked computer 1302 that communicates with the SSIs/APDs 302 via a local area network (LAN) 1304, such as illustrated in FIG. 13; or a remotely located host computer 1402 that interfaces with the comm/control bus 414 via the Internet 1404 and one or more LANs, such as illustrated in FIG. 14.

Figure 15:
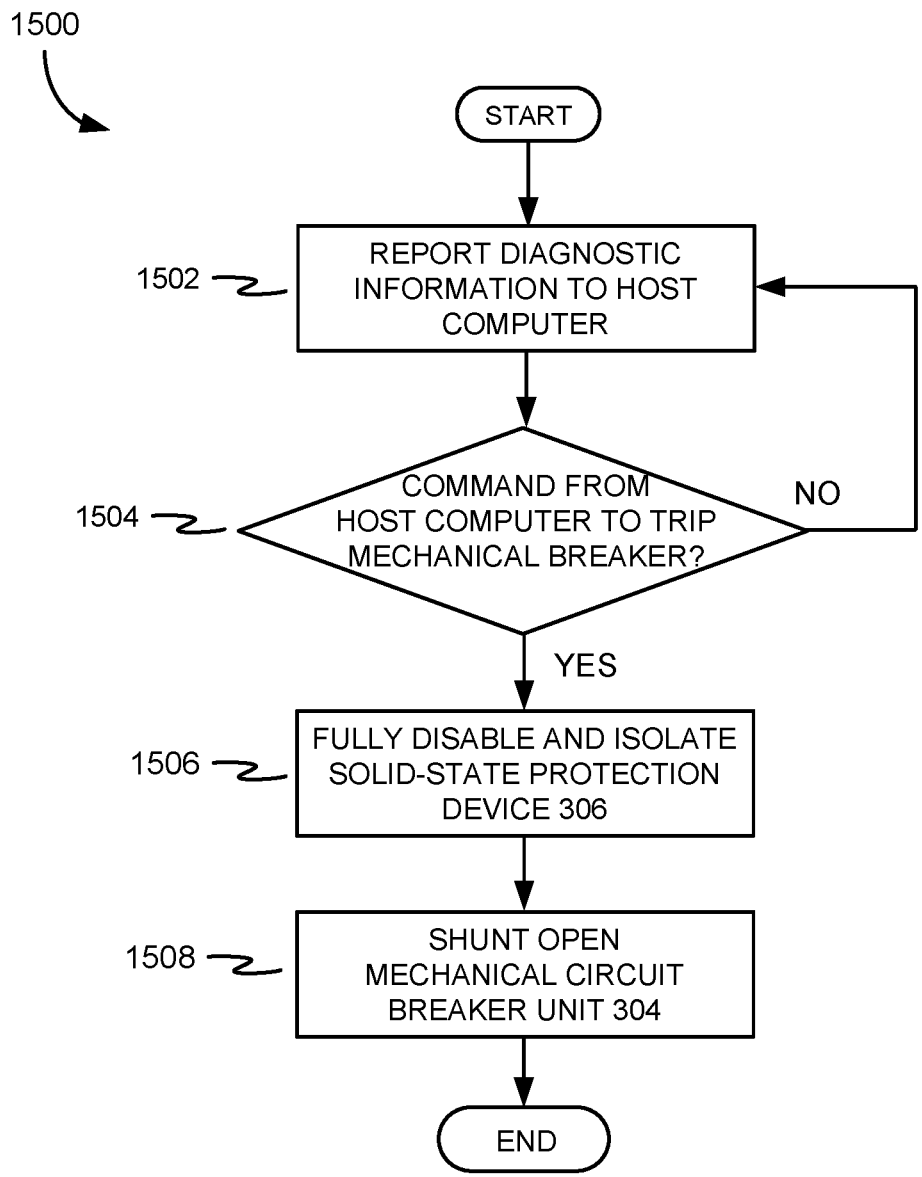
FIG. 15 is a flowchart illustrating a method that the microcontroller of the SSI/APD of the combined solid-state/mechanical circuit breaker apparatus depicted in FIG. 4 performs when a host computer determines that the SSI's/APD's solid-state protection device has failed or is malfunctioning, in accordance with one embodiment of the invention.

From the foregoing description it should be clear that the SSI/APD 302 of the combined solid-state/mechanical circuit breaker apparatus 300 is capable of detecting and isolating faults on its own, i.e., without requiring the mechanical circuit breaker unit 304 to trip. However, the mechanical circuit breaker unit 304 does serve several purposes. For example, its presence guarantees compliance with all electrical codes. Further, its presence is beneficial since it serves as a fail-safe, in the event that the solid-state protection device 406 fails or malfunctions. In one embodiment of the invention, each microcontroller 402 connected to the comm/control bus 414 is programmed and configured to collect and periodically report diagnostic information concerning the operational status of its solid-state protection device 406 to the host computer. FIG. 15 is a flowchart illustrating a method 1500 that the microcontroller 402 of an SSI/APD 302 performs in the event of a failing or malfunctioning solid-state protection device 406. First, at step 1502 the microcontroller 402 reports diagnostic information concerning the operational status of its solid-state protection device 406, over the comm/control bus 414 and to the host computer. Next, at decision 1504, if the microcontroller 402 receives a command from the host computer to trip the mechanical circuit breaker unit 304 (because the diagnostic information indicates that the solid-state protection device 406 has failed or is malfunctioning), at step 1506 the microcontroller 402 fully disables and electrically isolates the solid-state protection device 406 and then at step 1508 transmits a close signal to the shunt trip switch or relay 410 (see FIG. 4), which responds by producing a shunt trip trigger signal to cause the shunt trip coil 408 to pull open the contacts of the mechanical circuit breaker unit 304. It should be mentioned that the microcontroller 402 could alternatively (or also) be programmed to diagnose the operational status of its solid-state protection device 406 and direct the mechanical circuit breaker unit 304 to trip on its own, in other words, without having to rely on the host computer to diagnose any problem and wait for a command from the host computer to direct the mechanical circuit breaker unit 304 to trip. However, providing the host computer some level of control over the operational status of the SSI/APD 302, including the SSI's/APD's 302's solid-state protection device 406, is beneficial since when the SSI/APD 302 is configured in a hierarchy of SSIs/APDs 302, e.g., in an electrical distribution system, the ON/OFF status of each individual SSI/APD 302 can be manipulated by the host computer (and possibly irrespective of whether the solid-state protection device in any given SSI/APD 302 has failed), for example, to coordinate or adjust the hierarchy of the various SSIs/APDs 302 and/or to adapt to changing load conditions.

Figure 16:
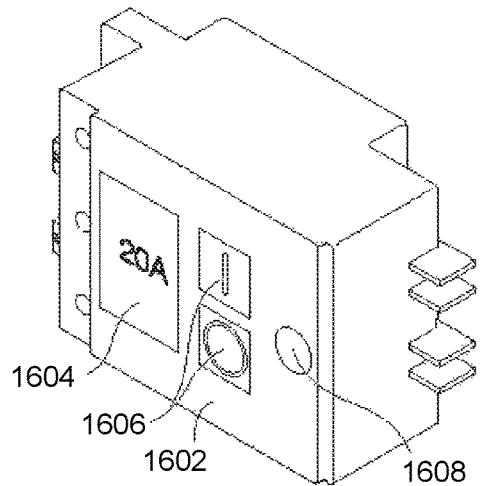
FIG. 16 is a drawing that illustrates how the SSI/APD and mechanical circuit breaker unit of the combined solid-state/mechanical circuit breaker apparatus depicted in FIG. 17 are housed together in a single enclosure, according to one embodiment of the present invention.
Figure 17:
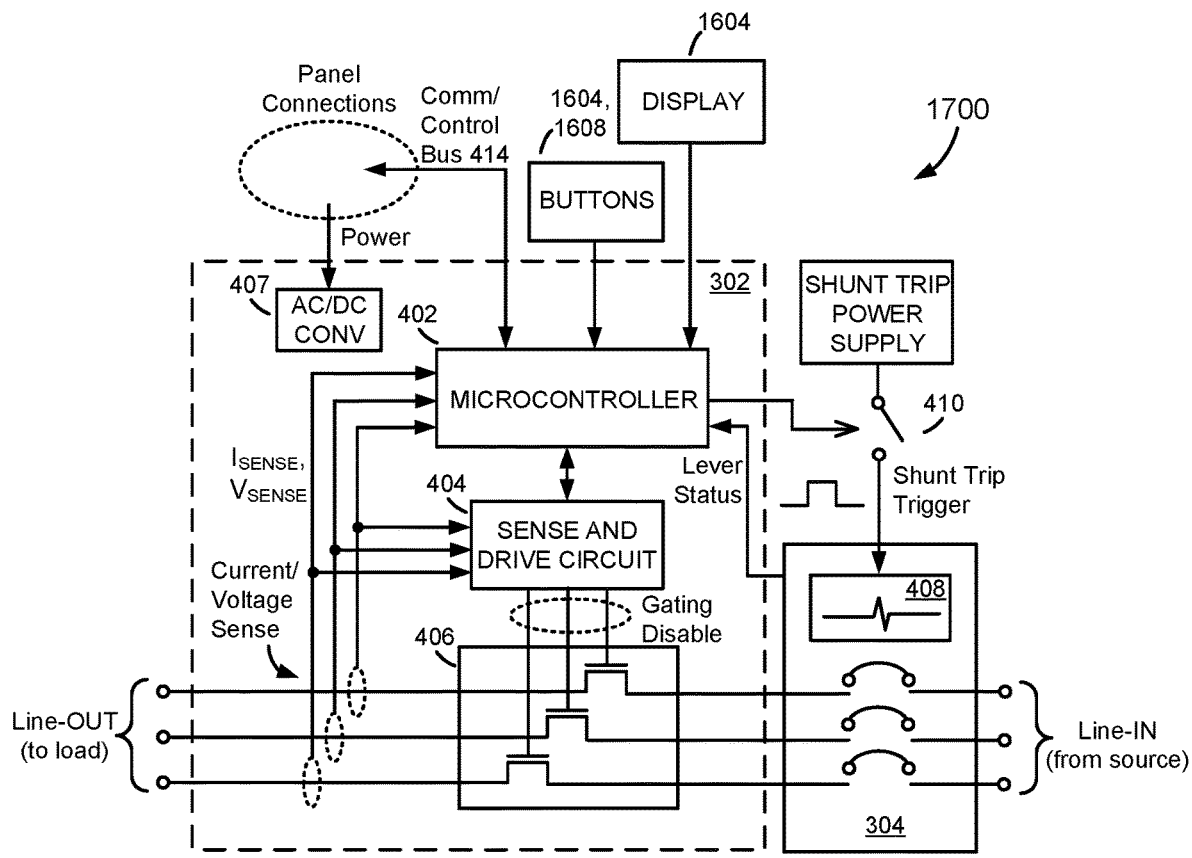
FIG. 17 is a drawing of a combined solid-state/mechanical circuit breaker apparatus, according to one embodiment of the invention.

Finally, in one embodiment of the invention the SSI/APD 302 and mechanical circuit breaker unit 304 are housed together in a single enclosure 1602, as illustrated in FIG. 16. According to this embodiment of the invention, the resulting combined solid-state/mechanical circuit breaker apparatus 1700 may further include, as illustrated in FIG. 17, a display 1604, ON/OFF buttons 1606, and a RESET button 1608. Under the direction of the microcontroller 402, the display 1604 can be configured to display a variety of information such as, for example, the amperage rating of the apparatus 1700 and real-time line current and voltage information. In one embodiment of the invention the display 1604 comprises an electronic ink display, which is a display technology that allows information being displayed to continue to be displayed even after DC power to the display 310 is removed. The ON/OFF buttons 1606 allow a user to connect or remove DC power to the SSI/APD 302. When DC power is removed the mechanical circuit breaker unit 304 remains in a ready state, tripping if conditions warrant. Finally, the RESET button 1608 provides a person the ability to RESET the apparatus 1700. When the RESET button 1608 is depressed, the SSI/APD 302 directs the microcontroller 402 to generate (or causes the microcontroller 402 to direct the sense and drive circuit 404 to generate) a gate enable signal that switches the solid-state protection device 406 ON. The RESET button 1608 is also mechanically coupled to an actuator inside the mechanical circuit breaker unit 304, so that as the RESET button 1608 is depressed the actuator operates to close the contacts of the mechanical circuit breaker unit 304, if they are not already closed.

While various embodiments of the present invention have been presented, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments of the invention but, instead, should be determined by the appended claims, including the full scope of equivalents to which such claims are entitled.

What is claimed is:

1. A solid-state circuit interrupter and arc inhibitor, comprising:
    a solid-state protection device configured to be connected in series with a mechanical circuit breaker in an electrical power distribution system;
    a driver circuit that directs the solid-state protection device to switch OFF and interrupt current flow through the solid-state protection device if a short circuit is present or imminent or an overload has persisted for an unacceptable duration of time;

a controller configured to control whether electrical contacts in the mechanical circuit breaker are opened after the solid-state protection device has been switched OFF and current flow has been interrupted;

short-circuit detection circuitry that determines whether current flowing through the solid-state protection device exceeds an instant-trip threshold current; and overload detection circuitry that determines whether current flowing through the solid-state protection device exceeds a long-time trip threshold current, wherein the short-circuit detection circuitry is configured to direct the driver circuit to immediately generate and apply a gating disable signal to a control input of the solid-state protection device if the current flowing through the solid-state protection device exceeds the instant-trip threshold current.

2. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current;

determining whether the current flowing through the solid-state protection device exceeds a rated current; and if it is determined that the current flowing through the solid-state protection device exceeds the rated current but does not exceed the maximum permissible current, allowing the solid-state protection device to remain ON for a predetermined duration of time but switching the solid-state protection device OFF if after the predetermined duration of time has expired the current flowing through the solid-state protection device continues to exceed the rated current; and tripping the mechanical circuit breaker after the solid-state protection device has been switched OFF.

3. The method of claim 2, wherein the duration of the predetermined duration of time is determined depending on time-current characteristics of the solid-state interrupter and arc prevention device.

4. The method of claim 3, wherein the solid-state interrupter and arc prevention device includes a controller that a user can program to set and adjust the time-current characteristics.

5. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time;

a controller configured to control whether electrical contacts in the mechanical circuit breaker are opened after the solid-state protection device has been switched OFF and current flow has been interrupted;

short-circuit detection circuitry that determines whether current flowing through the solid-state protection device exceeds an instant-trip threshold current; and overload detection circuitry that determines whether current flowing through the solid-state protection device exceeds a long-time trip threshold current, wherein the overload detection circuitry is configured to direct the driver circuit to generate and apply a gating disable signal to a control input of the solid-state protection device if the current flowing through the solid-state protection device exceeds the long-time trip threshold current, and the controller is configured to control the overload detection circuitry to delay application of the gating disable signal to the control terminal of the solid-state protection device depending on a magnitude of the current flowing through the solid-state protection device.

6. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the controller is programmable and a user can program and adjust time- and current-related operational parameters of the solid-state protection device.

7. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the controller is programmable and a user can program the controller to trip the mechanical circuit breaker after the solid-state protection device has been switched OFF and, alternatively, not trip the mechanical circuit breaker after the solid-state protection device has been switched OFF.

8. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the controller is configured to direct the driver circuit to generate a gating enable signal that switches the solid-state protection device back ON after a fault or overload has been cleared.

9. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the controller is configured to communicate with a host computer over a communications and control bus, and direct the driver circuit to generate a gating enable signal that switches the solid-state protection device back ON after a fault or overload has been cleared and in response to a reset command received from the host computer.

10. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the controller is configured to receive a lever status signal from the mechanical circuit breaker that indicates that a person or machine is attempting to manipulate a reset lever of the mechanical circuit breaker, and the controller is further configured to switch the solid-state protection device OFF if the lever status signal indicates that the person or machine is attempting to manually trip the circuit breaker.

11. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the solid-state protection device and mechanical circuit breaker are housed together in a single enclosure, and the solid-state protection device and mechanical circuit breaker further comprises an electronic display configured to be controlled by the controller.

12. A solid-state circuit interrupter and arc inhibitor, comprising:

a solid-state protection device configured to be connected in series with a mechanical circuit breaker in an electrical power distribution system;

a driver circuit that directs the solid-state protection device to switch OFF and interrupt current flow through the solid-state protection device if a short circuit is present or imminent or an overload has persisted for an unacceptable duration of time; and a controller configured to control whether electrical contacts in the mechanical circuit breaker are opened after the solid-state protection device has been switched OFF and current flow has been interrupted, wherein the solid-state protection device and mechanical circuit breaker are housed together in a single enclosure, and the solid-state protection device and mechanical circuit breaker further comprises user-controlled buttons or switches that a user can manipulate to apply or remove direct current power from the solid-state interrupter, trip the mechanical circuit breaker, and/or reset the mechanical circuit breaker.

13. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current; and tripping the mechanical circuit breaker after the solid-state protection device has been switched OFF, wherein tripping the mechanical circuit breaker is controlled by the solid-state interrupter and arc prevention device, tripping the mechanical circuit breaker after the solid-state protection device has been switched OFF is optional, and the solid-state interrupter and arc prevention device includes a controller that a user can program to control whether the solid-state interrupter and arc prevention device directs the mechanical circuit breaker to trip after the solid-state protection device has been switched OFF.

14. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current; and tripping the mechanical circuit breaker after the solid-state protection device has been switched OFF, wherein the solid-state interrupter and arc prevention device includes a controller configured to communicate with a host computer over a communications and control bus and to receive a reset command from the host computer that directs the solid-state interrupter and arc prevention device to reset and switch the solid-state protection device ON after a fault or overload has been cleared.

15. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current; and tripping the mechanical circuit breaker after the solid-state protection device has been switched OFF, wherein the solid-state interrupter and arc prevention device includes a controller configured to receive a lever status signal indicating that a person or machine is attempting to manipulate a reset lever of the mechanical circuit breaker and switch the solid-state protection device OFF if the lever status signal indicates that the person or machine is attempting to manually trip the mechanical circuit breaker.

16. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current;

determining whether a sudden change in the current flowing through the solid-state protection device is due to a resistive load being connected into the circuit or is attributable to a fault or developing fault;

allowing the solid-state protection device to remain ON if it is determined that the sudden change in the current is due to a resistive load being connected into the circuit;

switching the solid-state protection device OFF if it is determined that the sudden change in the current is attributable to a fault or a developing fault; and tripping the mechanical circuit breaker after the solid-state protection device has been switched OFF.

17. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current;

determining whether a sudden increase in a rate of change of current flowing through the solid-state protection device is a result of an inductive load being connected into the circuit; and allowing the inductive load to remain in the circuit so long as an inrush current does not exceed the maximum permissible current; and tripping the mechanical circuit breaker after the solid-state protection device has been switched OFF.

18. A method of protecting a circuit in an electrical distribution system, comprising:

connecting a solid-state interrupter and arc prevention device in series with a mechanical circuit breaker in the circuit;

sensing a current flowing through a solid-state protection device in the solid-state interrupter and arc prevention device;

determining whether the current flowing through the solid-state protection device exceeds a maximum permissible current;

switching the solid-state protection device OFF if it is determined that the current flowing through the solid-state protection device exceeds the maximum permissible current;

determining whether a sudden increase in a rate of change of current flowing through the solid-state protection device is attributable to a lighting strike or is indicative of a short circuit;

switching the solid-state protection device OFF if it is determined that the sudden increase in a rate of change of current flowing through the solid-state protection device is indicative of a short circuit; and allowing the solid-state protection device to remain ON if it is determined that the sudden increase in a rate of change of current flowing through the solid-state protection device is attributable to a lightning strike; and tripping the mechanical circuit breaker after the solid-state protection device has been switched OFF.

\* \* \* \* \*